(12) United States Patent
Fujimoto

(10) Patent No.: US 7,646,738 B2
(45) Date of Patent: Jan. 12, 2010

(54) WIRELESS NETWORK INFORMATION DISTRIBUTION METHOD

(75) Inventor: Munehiko Fujimoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 359 days.

(21) Appl. No.: 11/518,887

(22) Filed: Sep. 12, 2006

(65) Prior Publication Data

US 2007/0058630 A1 Mar. 15, 2007

(30) Foreign Application Priority Data

Sep. 12, 2005 (JP) ............................. 2005-264313

(51) Int. Cl.
*H04B 7/00* (2006.01)
(52) U.S. Cl. ................... 370/310; 370/395.5; 370/432
(58) Field of Classification Search ................ 370/312
See application file for complete search history.

(56) References Cited

U.S. PATENT DOCUMENTS 6,049,834 A * 4/2000 Khabardar et al. .......... 709/242
6,798,755 B2 * 9/2004 Lillie et al. ................. 370/312
7,280,495 B1 * 10/2007 Zweig et al. ................ 370/312
2007/0133483 A1 * 6/2007 Lee et al. .................... 370/338

FOREIGN PATENT DOCUMENTS

JP 2003-158548 A 5/2003

* cited by examiner

*Primary Examiner*—Vincent P Harper
*Assistant Examiner*—Natasha Cosme
(74) *Attorney, Agent, or Firm*—Crowell & Moring LLP

(57) ABSTRACT

An information distribution method for sending similar information from a sending node to all of receiving nodes in a given state in a dense wireless network. The sending node sends, only one time, information including status data directly to all of receiving nodes in an area where communication with the sending node is possible, not via a node other than the respective receiving nodes. Thereafter, the sending node determines whether or not any record corresponding to a receiving node to which the information should be sent is left in a distribution list. Only when it is determined that any record corresponding to a receiving node is left in the distribution list, the sending node sends information similar in content to the information sent in the directly sending step to the receiving node corresponding to the record left in the distribution list by using a unicast protocol.

4 Claims, 4 Drawing Sheets

PC LIST

| NAME OF RECEIVING PC | STATUS | ADDRESS |
|---|---|---|
| 10b | STANDBY | 123. aaa. bbb. cc1 |
| 10c | DURING PROCESSING | 123. aaa. bbb. cc2 |
| 10d | STANDBY | 123. aaa. bbb. cc3 |
| 10e | STANDBY | 123. aaa. bbb. cc4 |
| 10f | STANDBY | 123. aaa. bbb. cc5 |

DISTRIBUTION LIST  40

| NAME OF RECEIVING PC | ADDRESS |
|---|---|
| 10b | 123. aaa. bbb. cc1 |
| 10d | 123. aaa. bbb. cc3 |
| 10e | 123. aaa. bbb. cc4 |
| 10f | 123. aaa. bbb. cc5 |

41  42

WIRELESS NETWORK INFORMATION DISTRIBUTION METHOD

BACKGROUND OF THE INVENTION

1. Field of the Invention

The present invention relates to a method of distributing information in a wireless network, and more particularly to a technique for reducing the load on a wireless network in sending similar information to a number of nodes.

2. Description of the Related Art

In conventional wireless networks, a number of nodes located in the coverage area send and receive information to and from each other. When a sending node sends information to receiving nodes in a given state (for example, nodes that are moving at a speed of more than 80 km per hour) in such a wireless network, the sending node generally sends the information to each of the receiving nodes by using a unicast protocol, i.e., by specifying the respective addresses of the receiving nodes. However, where there are a large number of receiving nodes in the given state in the wireless network, the above method requires the sending node to repeat sending of the information the number of times corresponding to the number of the receiving nodes in the given state. This may cause increased traffic in the wireless network, thus resulting in increased load on the wireless network.

Multicast protocols (such as DVMRP, MOSPF, and so on) common in wired networks tend to involve a large number of packets for path control and involve long data headers. Therefore, if such a multicast protocol is used for sending and receiving information in a dense wireless network (having one hundred or more nodes in the coverage area), the wireless network may be congested due to the path control packets to have a heavy load. Accordingly, using the multicast protocols cannot solve the above described problem.

Japanese laid-open patent publication 2003-158548 discloses a packet sending/receiving system that achieves flexible and effective multicast when a terminal knows the logical device addresses of all other terminals that can communicate with the terminal itself as well as knowing the logical device address of the terminal itself. However, even with this technique, the above described problem cannot be solved.

SUMMARY OF THE INVENTION

An object of the present invention is to provide an information distribution method that, when similar information needs to be sent from a node to a number of nodes in a dense wireless network, can reduce the number of times the sending node sends the information so as to reduce the traffic in the wireless network and thus decrease the load on the wireless network.

According to a first aspect of the present invention, this object is achieved by an information distribution method for sending similar information from a sending node to all of nodes in a given state among nodes (hereinafter, referred to as "receiving nodes") other than the sending node within a wireless network, the wireless network being a dense network having one hundred or more nodes in a coverage area of the wireless network, the method comprising the steps of: determining whether or not each of the receiving nodes is in the given state based on a node list in which at least addresses and statuses are stored about all of the receiving nodes in the wireless network, and creating a distribution list, which is a list about receiving nodes to which the information should be sent, by selecting receiving nodes determined to be in the given state as the receiving nodes to which the information should be sent; sending, only one time, the information that includes data (hereinafter, referred to as "status data") indicating the given state directly to all of receiving nodes located within an area where communication with the sending node is possible; in response to receipt of an ACK signal from a receiving node, deleting a record corresponding to the receiving node from which the ACK signal has been sent from the distribution list; determining whether or not any record corresponding to a receiving node to which the information should be sent is left in the distribution list; and when it is determined that any record corresponding to a receiving node to which the information should be sent is left in the distribution list, sending information similar in content to the information sent in the directly sending step to the receiving node corresponding to the record left in the distribution list by using a unicast protocol.

In this method, the sending node sends, only one time, the information including the status data directly to all of receiving nodes in the area where communication with the sending node is possible, not via a node other than the respective receiving nodes, and thereafter the sending node determines whether or not any record corresponding to a receiving node to which the information should be sent is left in the distribution list. Only when it is determined that any record corresponding to a receiving node to which the information should be sent is left in the distribution list, the sending node sends information similar in content to the information sent in the directly sending step to the receiving node corresponding to the record left in the distribution list by using a unicast protocol. With this information distribution method, when a sending node needs to send information to a number of receiving nodes, the number of times the sending node sends the information can be reduced so that the traffic in the wireless network can be reduced and thus the load on the wireless network can be decreased, as compared to a conventional information distribution method in which a sending node repeats sending of information the number of times corresponding to the number of receiving nodes in a given state.

Preferably, in the deleting step, the sending node deletes a record corresponding to a receiving node from which an ACK signal has been sent from the distribution list only when the receipt of the ACK signal from the receiving node is before time spent while waiting for the ACK signal to be received from the receiving node exceeds a predetermined time.

Preferably, the status data about the receiving nodes to which the information should be sent is included in the information sent in the directly sending step, and addresses of the respective receiving nodes are excluded from the information sent in the directly sending step.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Referring now to the accompanying drawings, a preferred embodiment of the present invention is described. It is to be noted that the following description of preferred embodiment of the present invention has been presented for purposes of illustration and description, and is not intended to be exhaustive or to limit the present invention to the precise form disclosed.

Figure 1:
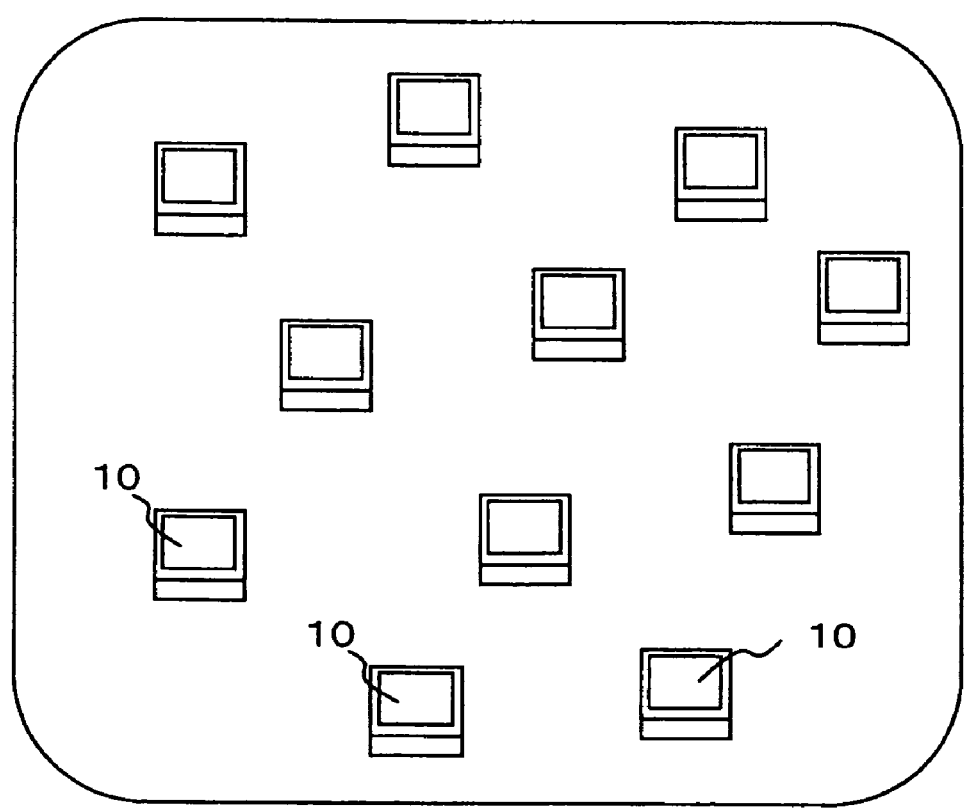
FIG. 1 is a conceptual illustration of a dense wireless network to which the present invention is applied.

FIG. 1 presents a conceptual illustration of a dense wireless network where an information distribution method embodying the present invention is used. This wireless network 1 has one hundred or more PCs 10 in the coverage area for wireless communication. The PCs 10 can send and receive information between them. In FIG. 1 to FIG. 3 and FIG. 6, only some of the one hundred or more PCs 10 are shown for simplicity.

Figures 2, 3:
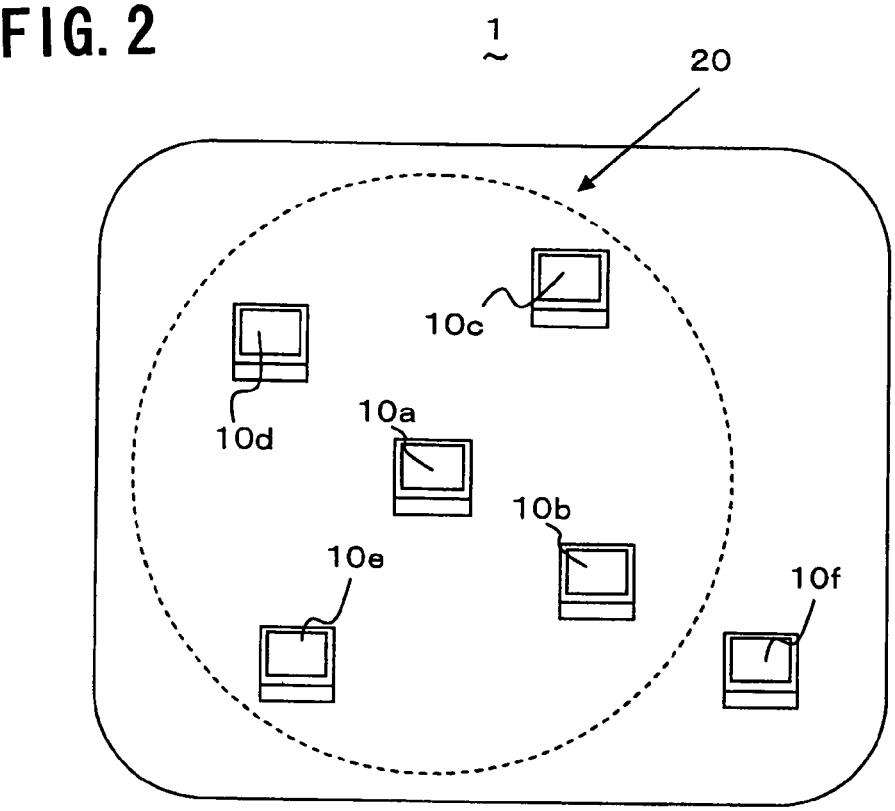
FIG. 2 is a view for illustrating sending/receiving of information in the wireless network.
FIG. 3 shows a PC list used in the wireless network.
Figure 4:
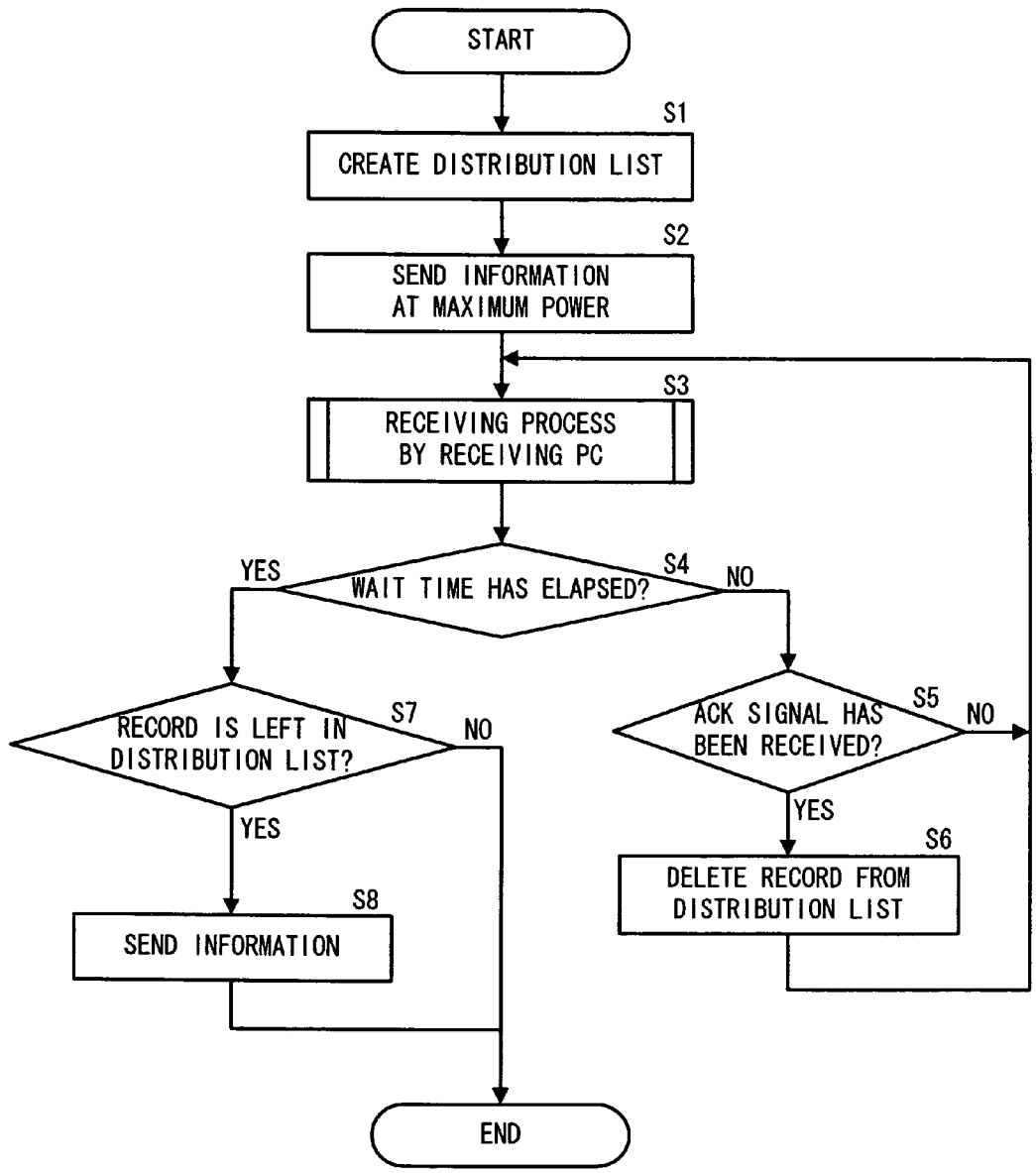
FIG. 4 is a flowchart showing the process of sending and receiving information in the wireless network.
Figures 5, 6:
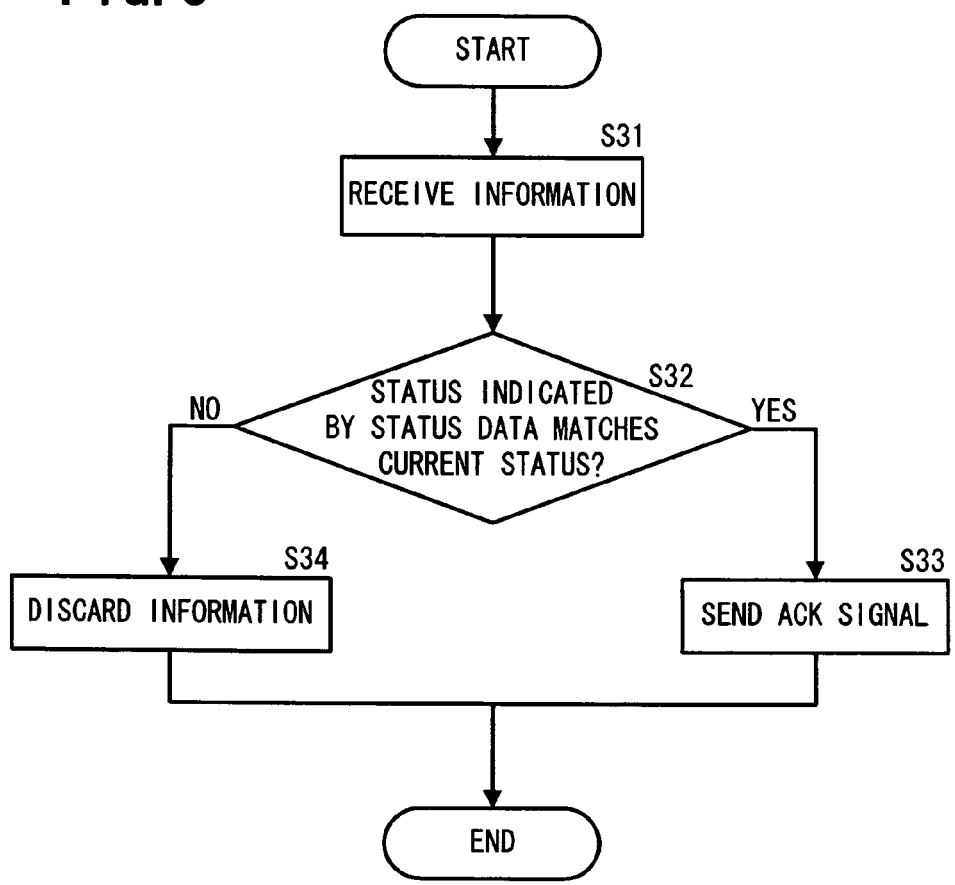
FIG. 5 is a flowchart showing a receiving process in FIG. 4 that is performed by a receiving PC.
FIG. 6 shows a distribution list used in the wireless network.

Referring now to FIG. 2 to FIG. 6, it is described how a sending PC (claimed sending node) in the wireless network 1 sends similar information to receiving PCs in a given state, e.g., receiving PCs in standby state, among all receiving PCs (nodes other than the sending PC in the wireless network 1; claimed receiving nodes) connected to the wireless network 1. FIG. 2 shows the configuration of the wireless network 1. This wireless network 1 has a sending PC 10a that sends information and receiving PCs 10b to 10f that receive the information. The area within which information sent from the sending PC 10a at the maximum power can be received is an area 20 indicated by a dashed line in FIG. 2. Thus, in the wireless network 1, the receiving PC 10f is located at a position where information cannot be received directly from the sending PC 10a. FIG. 3 shows a PC list (node list) held in the sending PC 10a. As shown in FIG. 3, stored in the PC list 30 are receiving PC names 31, statuses 32, and addresses 33 of all the receiving PCs 10b to 10f connected to the wireless network 1. FIG. 4 and FIG. 5 are flowcharts showing how to send information in the wireless network 1. FIG. 6 shows a distribution list (which is described later in detail) created by the sending PC 10a. It is to be noted that the PC list 30 is not limited to the form described above, but can contain other information such as the performances of the receiving PCs 10b to 10f.

The sending PC 10a first determines whether each of the receiving PCs 10b to 10f connected to the wireless network 1 is in standby state or not based on the PC list 30. The sending PC 10a then selects receiving PCs of which the status 32 is "Standby" as receiving PCs to which information should be sent, and creates a distribution list 40 as shown in FIG. 6 that contains receiving PC names 41 and addresses 42 of the selected receiving PCs (S1). Then, only one time at the maximum power, the sending PC 10a sends information, which includes data indicating the status of receiving PCs that should receive the information but does not include the addresses of the receiving PCs that should receive the information, directly, not via another receiving PC, to all of the receiving PCs 10b to 10e located within the area 20 where the sent information can be received (S2). When the receiving PCs 10b to 10e receive the information, they each perform a receiving process (S3). In the above example, the receiving PC 10f cannot receive information sent from the sending PC 10a. Thus, the receiving PC 10f does not perform the receiving process of the step S3.

Referring now to the flowchart shown in FIG. 5, the receiving process (S3) performed by the receiving PCs 10b to 10e is described. When each of the receiving PCs 10b to 10e receives the information sent from the sending PC 10a (S31), it determines whether or not the status indicated by the status data included in the received information, i.e., the standby state, matches the current status of the each receiving PC itself (S32). If the status indicated by the status data matches the current status (YES at S32), each of the receiving PCs 10b to 10e sends an ACK signal to the sending PC 10a (S33), and exits the receiving process. On the other hand, if the status indicated by the status data does not match the current status (NO at S32), each of the receiving PCs 10b to 10e discards the received information (S34) and exits the receiving process. In the above example shown in FIG. 3, the receiving PCs 10b, 10d, and 10e each send ACK signals to the sending PC 10a because they are in the standby state, while the receiving PC 10c that is during processing discards the received information.

After the receiving process (S3) by the receiving PCs 10b to 10e, the sending PC 10a determines whether or not time spent while waiting for ACK signals to be received from the receiving PCs exceeds a predetermined time (hereinafter referred to as "WAIT time") (S4). If the spent time is less than the WAIT time (NO at S4), the sending PC 10a determines whether or not an ACK signal has been received from each of the receiving PCs 10b to 10e (S5). If an ACK signal has been received from one of the receiving PCs (YES at S5), the sending PC 10a deletes a record corresponding to the one receiving PC, from which the ACK signal has been received, from the distribution list 40 (S6). If no ACK signal has been received (NO at S5), the sending PC 10a repeats the process from the step S3 without performing the process of the step S6. In the above example, since the sending PC 10a receives ACK signals from the receiving PCs 10b, 10d, and 10e, it deletes records corresponding to the receiving PCs 10b, 10d, and 10e from the distribution list 40.

When the time spent while waiting for ACK signals to be received exceeds the WAIT time (YES at S4), the sending PC 10a then determines whether or not any record corresponding to a receiving PC to which the information should be sent is left in the distribution list 40 (S7). If it is determined that any record corresponding to a receiving PC is left in the distribution list 40 (YES at S7), the sending PC 10a sends information similar in content to the information sent at the step S2 to the receiving PC corresponding to the record left in the list by using a unicast protocol (S8), and exits the information sending process. If no record corresponding to a receiving PC is left in the distribution list 40 (NO at S7), the sending PC 10a exits the information sending process without performing the process of the step S8. In the above described example shown in FIG. 3 and FIG. 6, since the sending PC 10a does not receive an ACK signal from the receiving PC 10f, there is the receiving PC 10f left in the distribution list 40. Therefore, the sending PC 10a sends the information to the receiving PC 10f by the unicast protocol. Accordingly, the sending PC 10a can send similar information to all of the receiving PCs 10b and 10d to 10f in the given state (standby state) in the wireless network 1 only by performing the process for sending the information two times in all. It is to be noted that the information sent at the step S8 is substantially identical in content to the information sent at the step S2, but the information sent at the step S8 does not include data indicating the status of receiving PCs that should receive the information but includes the respective addresses of the receiving PCs.

As described above, in the wireless network 1 using the information distribution method according to this embodiment, the sending PC 10a sends, only one time at the maximum power, information including data (claimed status data) indicating the status of receiving PCs that should receive the information directly not via another receiving PC to all of the receiving PCs 10b to 10e located within the area 20 where the sent information can be received. Thereafter, the sending PC 10a determines whether or not any record corresponding to a receiving PC to which the information should be sent is left in the distribution list 40. Only when any record corresponding to a receiving PC is left, the sending PC 10a sends the information to the receiving PC corresponding to the record left in the distribution list 40, i.e., the receiving PC 10f, by using the unicast protocol. Thereby, the similar information can be sent to all of the receiving PCs 10b and 10d to 10f corresponding to all records in the distribution list 40. Accordingly, when the sending PC 10a needs to send similar information to a number of receiving PCs 10b and 10d to 10f, the number of times the sending PC 10a sends the information can be reduced so that the traffic in the wireless network 1 can be reduced and thus the load on the wireless network 1 can be decreased, as compared to the conventional information distribution method in which sending of information is repeated the number of times corresponding to the number of receiving nodes in a given state.

The present invention has been described above using a presently preferred embodiment, but those skilled in the art will appreciate that various modifications are possible. For example, although described in the above embodiment is sending and receiving of information by the PCs 10 connected to the wireless network 1, the nodes included in the wireless network 1 to which the present invention is applied are not limited to the PCs but can be wireless PDAs, mobile phones, PHSs, or other devices that can send and receive similar information over a wireless network.

Further, in the above described embodiment, the sending PC 10a sends the similar information to the receiving PCs 10b and 10d to 10f in the standby state among the receiving PCs 10b to 10f, but this is only an example. To which nodes a node sends information can be selected based on other statues or performances common to the receiving nodes. For example, it is possible to send similar information to receiving PCs of which the status is "During Processing" or to receiving PCs having a given performance.

This application is based on Japanese patent application 2005-264313 filed Sep. 12, 2005, the contents of which are hereby incorporated by reference.

What is claimed is:

1. An information distribution method for sending similar information from a sending node to all receiving nodes in a standby state, the receiving nodes including all nodes other than the sending node within a wireless network, the wireless network being a dense network having one hundred or more nodes in a coverage area of the wireless network, the method comprising the steps of:

determining whether or not each of the receiving nodes is in the standby state based on a node list in which at least addresses and statuses are stored about all of the receiving nodes in the wireless network by determining for each receiving node in the node list whether the status for the receiving node in the node list matches the standby state, and creating a distribution list, which is a list of receiving nodes to which the information should be sent, by selecting receiving nodes determined to be in the standby state as the receiving nodes to which the information should be sent and including a record for each of the selected receiving nodes in the distribution list;

sending, only one time at the maximum power, the information that includes status data indicating that the information is for receiving nodes in the standby state directly to all of receiving nodes located within an area where communication with the sending node is possible and wherein all of the addresses of the respective receiving nodes are excluded from the information sent in the directly sending step;

in response to receipt of an ACK signal from a receiving node, deleting a record corresponding to the receiving node from which the ACK signal has been sent from the distribution list;

determining whether or not any record corresponding to a receiving node to which the information should be sent is left in the distribution list; and when it is determined that any record corresponding to a receiving node to which the information should be sent is left in the distribution list, sending information similar in content to the information sent in the directly sending step to the receiving node corresponding to the record left in the distribution list by using a unicast protocol.

2. The information distribution method according to claim 1, wherein, upon receipt of the information sent from the sending node in the directly sending step, a receiving node determines whether or not status indicated by the status data included in the information matches current status of the receiving node itself, and sends an ACK signal to the sending node when the status indicated by the status data matches the current status.

3. The information distribution method according to claim 2, wherein in the deleting step, the sending node deletes a record corresponding to a receiving node from which an ACK signal has been sent from the distribution list only when the receipt of the ACK signal from the receiving node is before time spent while waiting for the ACK signal to be received from the receiving node exceeds a predetermined time.

4. The information distribution method according to claim 1, wherein in the deleting step, the sending node deletes a record corresponding to a receiving node from which an ACK signal has been sent from the distribution list only when the receipt of the ACK signal from the receiving node is before time spent while waiting for the ACK signal to be received from the receiving node exceeds a predetermined time.

* * * * *